US011814610B2

(12) United States Patent
Gosselin et al.

(10) Patent No.: US 11,814,610 B2
(45) Date of Patent: Nov. 14, 2023

(54) USE OF A YEAST PROTEIN EXTRACT TO STABILISE BEER HAZE

(71) Applicant: LESAFFRE ET COMPAGNIE, Paris (FR)

(72) Inventors: Yves Gosselin, Allouagne (FR); Rudy Menin, Choisy le Roi (FR); Stéphane Meulemans, Rixensart (BE)

(73) Assignee: LESAFFRE ET COMPAGNIE, Paris (FR)

(*) Notice: Subject to any disclaimer, the term of this patent is extended or adjusted under 35 U.S.C. 154(b) by 715 days.

(21) Appl. No.: 16/312,343

(22) PCT Filed: Jun. 26, 2017

(86) PCT No.: PCT/FR2017/051702
§ 371 (c)(1),
(2) Date: Dec. 21, 2018

(87) PCT Pub. No.: WO2018/002505
PCT Pub. Date: Jan. 4, 2018

(65) Prior Publication Data
US 2019/0161713 A1 May 30, 2019

(30) Foreign Application Priority Data

Jun. 27, 2016 (FR) ...................... 1655992

(51) Int. Cl.
*C12C 5/02* (2006.01)
*C12H 1/14* (2006.01)
*C12C 12/00* (2006.01)
*A23L 2/62* (2006.01)
*A23L 2/52* (2006.01)

(52) U.S. Cl.
CPC .............. *C12C 5/02* (2013.01); *A23L 2/52* (2013.01); *A23L 2/62* (2013.01); *C12C 12/00* (2013.01); *C12H 1/14* (2013.01)

(58) Field of Classification Search
CPC .. C12C 5/02; C12C 12/00; C12H 1/14; A23L 2/62
See application file for complete search history.

(56) References Cited

U.S. PATENT DOCUMENTS 5,962,045 A * 10/1999 Rubelmann .............. C12H 1/18
426/8
2013/0309721 A1 11/2013 Lankhorst et al.

FOREIGN PATENT DOCUMENTS

| CL | 48443 B | 7/2012 |
| CN | 1936006 A | 3/2007 |
| CN | 102662036 A | 9/2012 |
| EP | 1 240 306 B1 | 3/2004 |
| EP | 3 141 131 A1 | 3/2017 |

(Continued)

OTHER PUBLICATIONS

"Spring Finer" https://fermentis.com/en/product/springfiner/ Retrieved Mar. 7, 2023 (Year: 2023).*

(Continued)

*Primary Examiner* — Katherine D Leblanc
(74) *Attorney, Agent, or Firm* — Duane Morris LLP; Thomas J. Kowalski; Deborah L. Lu

(57) ABSTRACT

The present invention relates to the use of a yeast protein extract to stabilise the haze or cloudiness of a drink, particularly beer and preferably white beer.

11 Claims, 3 Drawing Sheets

(56) References Cited

FOREIGN PATENT DOCUMENTS

| | | |
|---|---|---|
| FR | 2369798 A1 | 6/1978 |
| JP | 2006275751 A | 10/2006 |
| WO | 2015/170714 A1 | 12/2015 |

OTHER PUBLICATIONS

JP 2014124154 Published Jul. 7, 2014 (Year: 2014).*
Anonymous: Spring Finer (Oct. 2015) Retrieved from the Internet: URL:http://www.fermentis.com/wp-content/uploads/2016/12/SpringFiner_FR.pdf. Retrieved on Mar. 2, 2017.
Anonymous: Brewing Solutions:: Biocloud (Feb. 16, 2015) Retrieved from the Internet: URL:http://web.archive.org/web/20150216152629/http://brewing-solutions.com/products/?id=21. Retrieved on Mar. 2, 2017.

* cited by examiner

Figure 1
Fig 1a
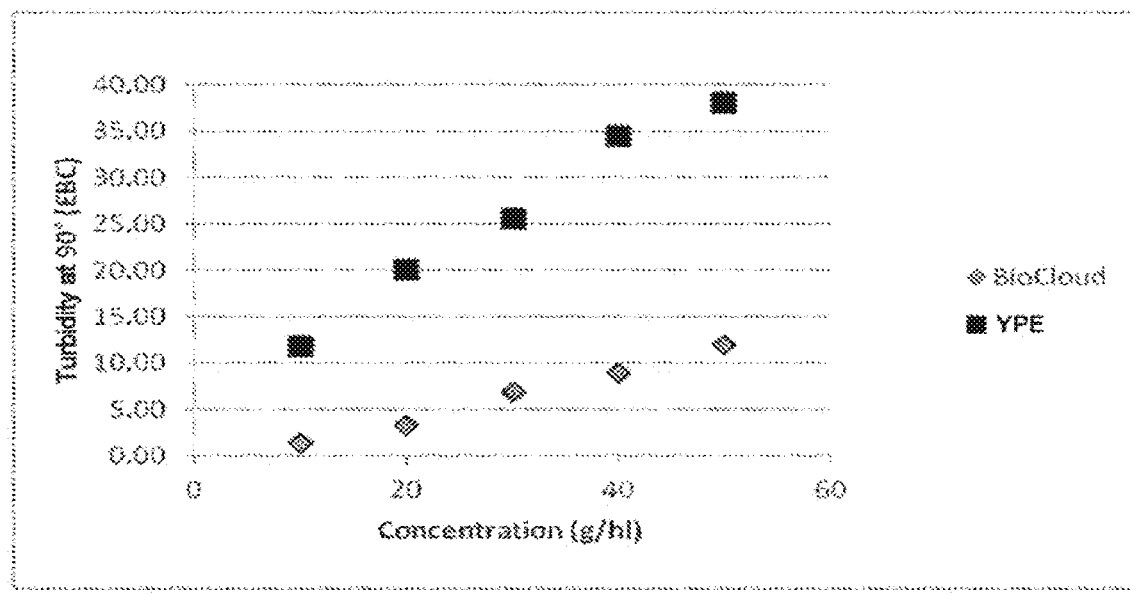
Fig. 1b
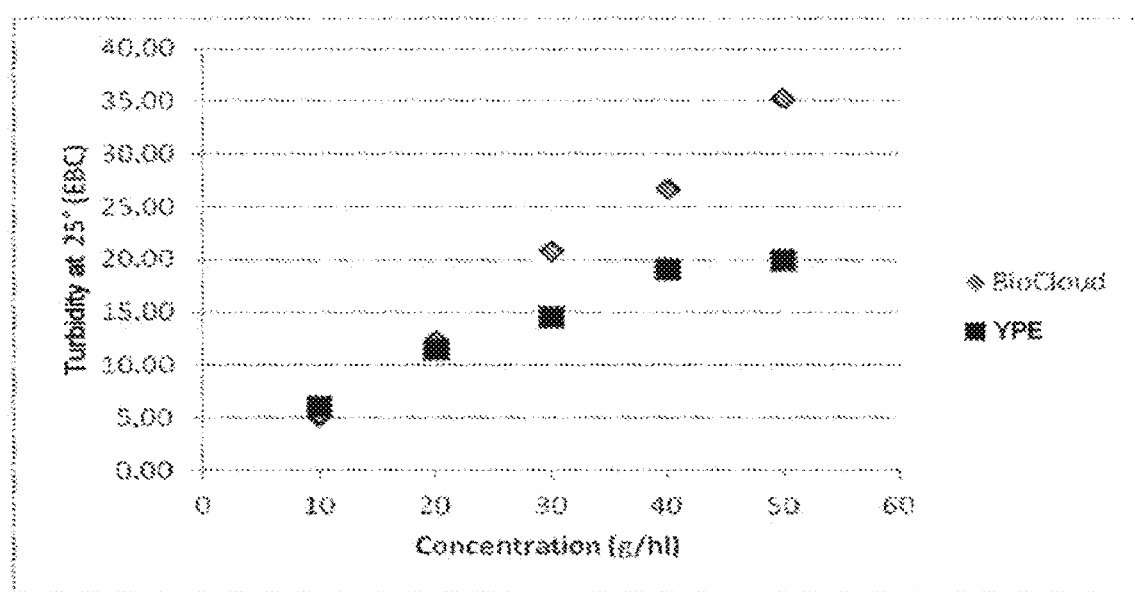

Figure 2
Fig. 2a
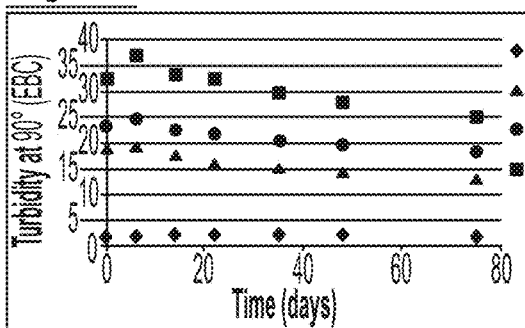
Fig. 2b
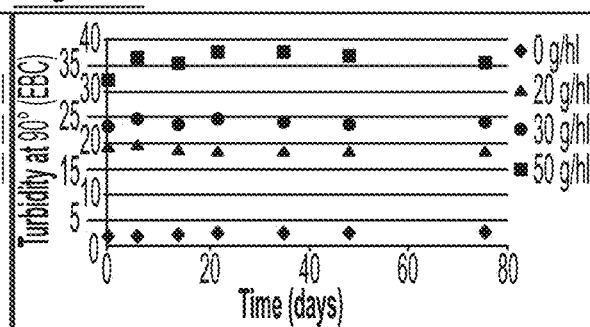
Figure 3
Fig. 3a
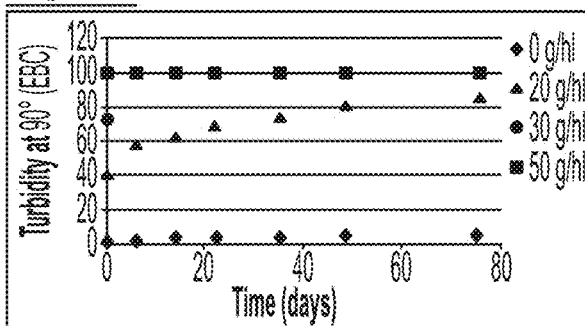
Fig. 3b
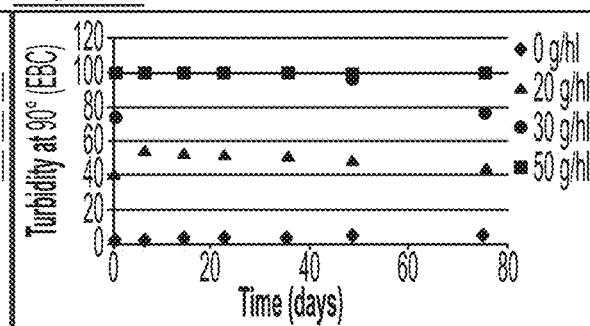
Figure 4
Fig. 4a
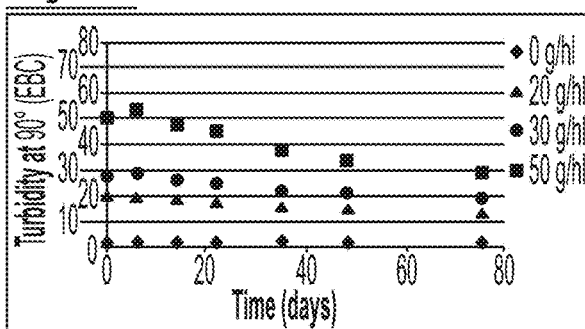
Fig. 4b
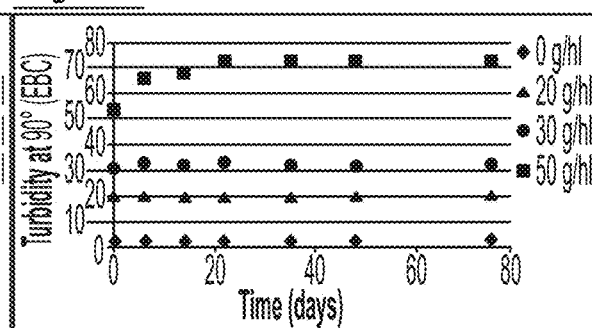
Figure 5
Fig. 5a
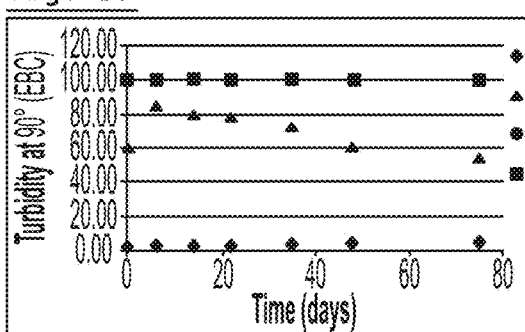
Fig. 5b
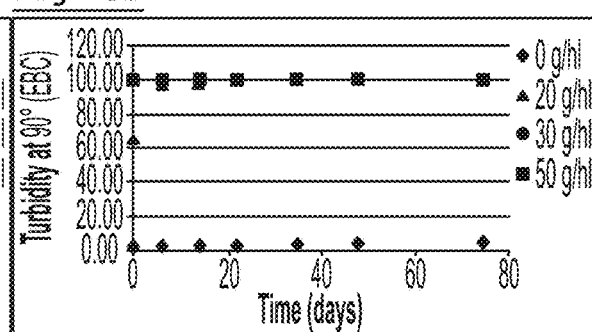

USE OF A YEAST PROTEIN EXTRACT TO STABILISE BEER HAZE

RELATED PATENT APPLICATIONS

The present application is filed pursuant to 35 U.S.C. § 371 as a U.S. National Phase Application of International Patent Application No. PCT/FR2017/051702, which was filed on Jun. 26, 2017, claiming the benefit of priority to French Patent Application No. FR 16/55,992 filed on Jun. 27, 2016. The content of each of the aforementioned Patent Applications is incorporated herein by reference in its entirety.

The subject of the present invention is a novel use of a yeast protein extract, namely for stabilizing the haze of a drink, especially beer, and preferably white beer.

Beer is one of the only universal drinks, present in virtually all the countries in the world. A beer is composed of four main ingredients, namely water, hops, barley and yeast. The lengthy conversion of these elements into beer is spread over a period ranging from two to three weeks (for industrial beers) to several months (for bières de garde [keeping beers], high fermentation beers, trappist beers, etc.). The purity and qualities of the water are determining factors in the clarity and flavor of the beer. The proportion of the main mineral salts contained in the water (sodium, chloride, calcium, magnesium, sulfate and bicarbonate) will have an influence on the softness or hardness in the mouth, but also during the production of the beer.

White beer, contrary to what may be expected, does not denote a color of beer but rather an ingredient: wheat. White beers are beers comprising a large proportion of wheat in addition to the barley (and potentially to other grains). White beers generally have a natural haze (unless the beer is filtered) which gives them a milky appearance. This milky appearance and the semantic similarity in German of the words white (weiss) and wheat (weizen) explains the use of the word "white". However, by using roasted or caramel malts, it is possible to make amber, brown or even black white beers.

Traditionally, there are two main types of white beer:

German "Weissbier/Weizenbier", made with a majority of malted wheat and a supplement of malted barley, fermented with specific yeasts that produce lots of phenols and giving spicy notes such as clove notes, Belgian white beers (or "witbier" in Flemish), predominantly resulting from malted barley and raw or malted wheat, commonly spiced with bitter or sweet orange zest and coriander seeds.

Beer haze is predominantly caused by protein residues (approximately 40 to 75%) and polyphenols (1.1-7.7%), and to a lesser extent by carbohydrates (2-15%)[1,2]. Haze may also be due to other residues such as starch, pentosans, oxalate, β-glucans, etc.[3].

Moreover, there are two forms of haze: chill haze, which is reversible, and permanent haze which is a result of the oxidation of the beer as it ages[8]. In both cases, the compounds predominantly involved in the formation of the colloids are proteins and polyphenols.

Chill haze forms gradually when the temperature lowers to around 0° C., but disappears when the beer is warmed up again. It is due to a temporary and hence reversible association between proteins and polyphenols, which are not covalently bonded but rather bonded by hydrogen bonds, hydrophobic interactions and ionic bonds.

As for permanent haze, as the polyphenols are increasingly oxidized as the beer ages, the bonds connecting them to the proteins multiply and become reinforced, and become covalent bonds. The insoluble complexes created no longer dissolve under the effect of heat, and the haze becomes permanent[9]. It should be specified that the presence of some metal ions also promotes the appearance of haze.

Several studies have been carried out to date in order to identify the proteins that cause haze. Thus, acidic proteins derived from albumin and barley globulins could be responsible for haze formation[4]. It has also been demonstrated that proline-rich proteins were involved in haze formation[1,3,5,6,7]. As regards polyphenols, those involved in colloidal stability are flavonoids.

In the field of beer, and particularly white beer, it is necessary for the beer to have permanent and stable haze.

This is because the "milky" appearance is an integral component of white beer, due to the presence of wheat in the recipe. This contributes to the particular character of this beer and makes it attractive to consumers.

In order to improve and/or adjust the haze or turbidity of beer, cider or other alcoholic or non-alcoholic drinks, it is possible to add one (or more) clouding agent(s).

Clouding agents added to the drinks give a more natural appearance to the drink.

Among the clouding agents commonly used in drinks, mention may be made of proteins, water-soluble gums and oil-soluble gums.

As an example of water-soluble gum, mention will be made of gum arabic or acacia gum, which acts in the drink to prevent the precipitation of suspended particles.

Mention may also be made, as examples of clouding agents, of those sold:

under the name "Cloudix WB®" by CBS (Customized Brewing Solutions), which is an emulsion of a coprah extract in water, under the name "Biocloud®" by Kerry, which is a yeast derivative.

However, the clouding agents of the prior art are not particularly suited to beer, and especially white beer, in which they are not always stable. Indeed, despite their presence in white beer, its turbidity decreases over time.

There is therefore still a need to develop novel clouding or turbidity agents for drinks, and more particularly for beer, and preferably white beer.

The inventors have discovered, entirely unexpectedly and surprisingly, that a yeast protein extract made it possible to stabilize the haze or turbidity of drinks, and especially beer, and preferably white beer, in a manner that is satisfactory over time.

This discovery is entirely unexpected, since a yeast protein extract has especially been described in the prior art for a use for fining drinks, in particular winelo.

"Fining" is a technique which consists in introducing, into a product to be treated (liquids, musts/worts), a substance capable of flocculating and settling, by precipitation in its sediment, particles suspended in said product, with the aim especially of improving the clarity, filterability and stability of said product. Thus, due to fining, the visible and/or invisible particles suspended in the product, and also the load of colloids which are responsible for haze and the lack of filterability of said product, are greatly reduced or even entirely eliminated.

The inventors' discovery is therefore entirely unexpected, since, according to the invention, the yeast protein extract has in a certain sense the opposite effect of that suggested by the prior art.

Indeed, according to the invention, the yeast protein extract is not used to eliminate the suspended particles by precipitation (fining) but rather, on the contrary, to prevent the precipitation of the suspended particles (haze stabilization).

Thus, the subject of the present invention is the use of a yeast protein extract for stabilizing the haze or turbidity of a drink, especially beer, and preferably white beer.

In the present application, the haze of the drink, and especially of beer, denotes the turbidity of the drink and especially of the beer.

Turbidity denotes the content of material in a fluid which causes the haze thereof.

Turbidity is measured by different photometry methods for cloudy media, such as nephelometry, opacimetry and turbidimetry. Generally speaking, it is expressed in NTU (Nephelometric Turbidity Units). In the brewing field, haze measurement units are EBC (European Brewing Convention), ASBC (American Society of Brewing Chemists), Helm and FTU (Formazin Nephelometric Unit). The relationship between these different units is as follows: 1 EBC=69.2 ASBC=40 Helm=4 FTU (Analytica EBC—method 9.30).

Turbidity measurements are carried out using an apparatus such as a turbidimeter or nephelometer. This is generally a photoelectric receptor that measures the light scattered by the liquid. More particularly, it is the scattering of the light by the suspensions that makes it possible to evaluate the concentration of suspended substances in a liquid. This apparatus generally consists of a source of white light or infrared light. In nephelometry, the scattered light is measured at an angle of 90° and at an angle of 25° relative to the incident light. In turbidimetry, the scattered light is measured by a detector placed in the axis of the incident light.

The yeast protein extract (YPE) used according to the invention denotes products originating from the plasmolysis and lysis of "intact" yeast, that is to say live or deactivated "whole" yeast.

The yeast protein extract used according to the invention comprises from 30 to 40% by weight of proteins having a molecular weight of greater than 15 kDa and preferably greater than 30 kDa.

The yeast protein extract used according to the invention also comprises from 10 to 14% by weight of ribonucleotides having a mean number of bases of 280.

By way of example, a yeast protein extract advantageously used according to the invention comprises:

from 30 to 40% by weight of proteins having a molecular weight of greater than 15 kDa and preferably greater than 30 kDa, from 10 to 14% by weight of ribonucleotides having a mean number of bases of 280, the percentages by weight being defined relative to the total weight of the YPE.

The yeast protein extract (YPE) as used according to the invention is particularly advantageous since it has been obtained according to a process which enabled the extraction and preservation of the native proteins from a specially selected yeast strain.

The mains steps of the process for preparing the YPE are as follows:

plasmolysis of an intact (whole) yeast, in order on the one hand to release the internal macromolecules from said yeast in their native state and on the other hand to inactivate the lysis enzymes of these macromolecules, separation by centrifugation, recovery of the soluble fraction containing the YPE, optionally drying the soluble fraction.

The yeast protein extract used according to the invention may be in the form of a more or less concentrated powder or liquid, and preferably in the form of a powder.

According to the invention, the yeast is for example selected from the group consisting of *Saccharomyces, Kluyveromyces, Torula, Candida,* and is preferably *Saccharomyces,* and advantageously *Saccharomyces cerevisiae.*

By way of example of YPE used according to the invention, mention may be made of that sold by Fermentis under the name "Spring'Finer®".

It is more particularly a protein extract originating from a *Saccharomyces cerevisiae* yeast strain.

Exclusively of yeast origin, the YPE "Spring'Finer®" is allergen-free.

According to an advantageous embodiment of the invention, the yeast protein extract is in the form of powder and is used at a content ranging from 5 g (grams) to 80 g per hectoliter (hl) of drink, preferably from 20 to 60 g/hl, and more preferentially from 30 to 50 g/hl.

When the drink is beer, and especially white beer, the use of a yeast protein extract at a content of 30 to 50 g/hl is particularly suitable.

According to an advantageous embodiment of the invention, the yeast protein extract makes it possible to stabilize the haze of the drink, and especially beer, and preferably white beer, at a turbidity ranging from 40 to 120 EBC, preferably from 50 to 110 EBC and even more preferentially from 60 to 100 EBC, for a period of time ranging from 0 to 80 days, the turbidity values being measured using a Haffmans VOS ROTA 90/25 nephelometer at a temperature of 4° C. and for a 90° angle (Analytica EBC—method 9.30).

The Haffmans VOS ROTA 90/25 nephelometer is designed to measure beer haze in bottles and in cuvettes at two measurement angles:

particles less than 1 μm, such as proteins, mainly causing dispersion of light at a 90° angle, particles greater than 1 μm, such as yeasts, mainly causing dispersion of light at a 25° angle.

This instrument complies with the recent MEBAK recommendations.

The turbidity values are expressed in EBC, ASBC, Helm or FTU. The relationship between these different units is as follows: 1 EBC=69.2 ASBC=40 Helm=4 FTU.

The use of suitable concentrations of the yeast protein extract enables satisfactory stabilization over time of the haze of drinks, and especially beer, and preferably white beer.

Stability over time is intended to mean stability extending up to 80 days under conditions of storage at a temperature of 4° C.

The present invention will now be illustrated using the examples and figures below, given by way of entirely nonlimiting illustration.

The YPE used in the examples of the invention is the "Spring'Finer®" YPE and is denoted "YPE" or "Spring'Finer YPE" without distinction. It is an entirely soluble product which is in microgranular form, promoting the dissolution thereof and making the use thereof secure. It does not require any treatment prior to being used, such as pH adjustments or the like.

The YPE of the invention is compared to the clouding agent of the prior art, namely "Biocloud®" sold by Kerry, which is a yeast derivative.

The turbidity values described in the examples of the invention are measured with the Haffmans VOS ROTA 90/25 turbidimeter and are expressed in EBC.

FIG. 1 illustrates the influence of the concentration (g/hl) of the clouding agent (YPE and Biocloud) on the turbidity (EBC) of stabilized beer of "pits" type, at a 90° angle (FIG. 1a) and 25° angle (FIG. 1b) at the time to. The turbidities are measured at a temperature of 4° C.

FIG. 2 illustrates the turbidity values (EBC) obtained as a function of time (expressed in days) for a non-stabilized beer to which a "native" YPE has been added, that is to say a YPE that has not undergone pasteurization. The samples were stored at 20° C. and the measurements are carried out at a temperature of 20° C. and at a 90° angle. Different concentrations of YPE were tested (0, 20, 30, 50 g/hl).

FIG. 2a relates to the results obtained when the sample of beer has not been agitated before measurement, and FIG. 2b when the sample of beer is agitated before measurement.

FIG. 3 illustrates the turbidity values (EBC) obtained as a function of time (days) for a non-stabilized beer to which a "native" YPE has been added. The samples were stored at 4° C. and the measurements are carried out at a temperature of 4° C. and at a 90° angle. Different concentrations of YPE were tested (0, 20, 30, 50 g/hl).

FIG. 3a relates to the results obtained when the sample of beer has not been agitated before measurement, and FIG. 3b when the sample of beer is agitated before measurement.

FIG. 4 illustrates the turbidity values (EBC) obtained as a function of time (days) for a non-stabilized beer to which a YPE pasteurized at 70° C. for 20 minutes has been added. The samples were stored at 20° C. and the measurements are carried out at a temperature of 20° C. and at a 90° angle. Different concentrations of YPE were tested (0, 20, 30, 50 g/hl).

FIG. 4a relates to the results obtained when the sample of beer has not been agitated before measurement, and FIG. 4b when the sample of beer is agitated before measurement.

FIG. 5 illustrates the turbidity values (EBC) obtained as a function of time (days) for a non-stabilized beer to which a YPE pasteurized at 70° C. for 20 minutes has been added. The samples were stored at 4° C. and the measurements are carried out at a temperature of 4° C. and at a 90° angle. Different concentrations of YPE were tested (0, 20, 30, 50 g/hl).

FIG. 5a relates to the results obtained when the sample of beer has not been agitated before measurement, and FIG. 5b when the sample of beer is agitated before measurement.

EXAMPLES

Example 1

Figure 6:
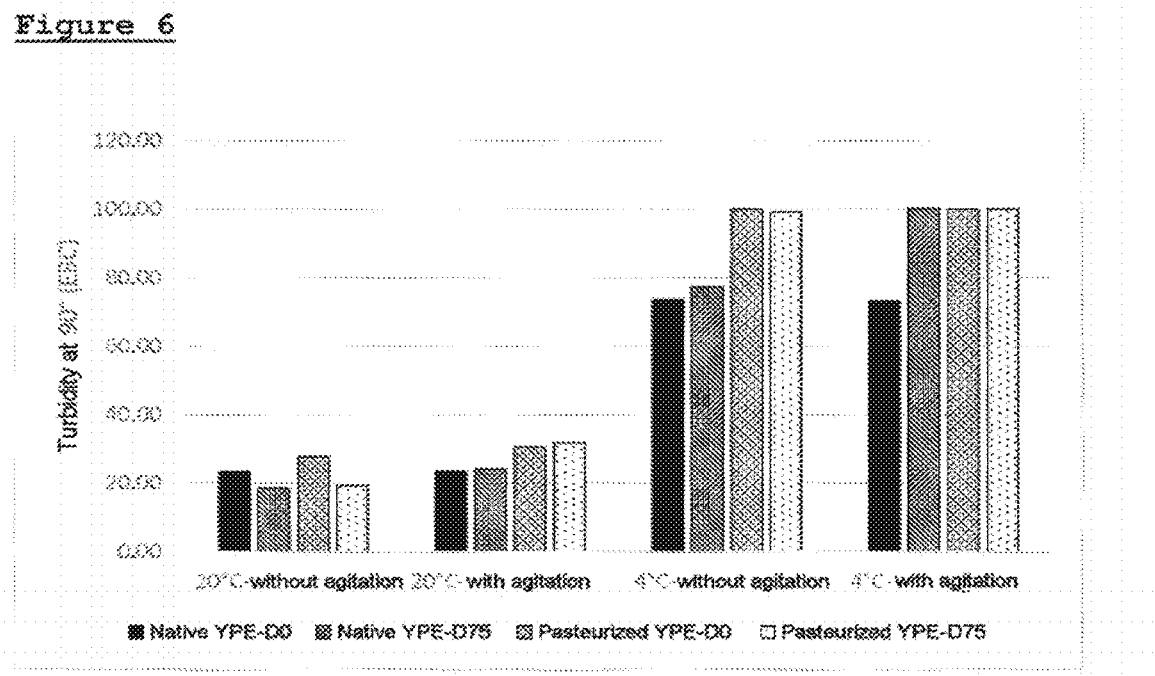
FIG. 6 is a histogram summarizing all the data obtained from FIGS. 2 to 5. More particularly, it illustrates the turbidities obtained for a YPE at a concentration of 30 g/hl (native YPE, YPE pasteurized for 20 minutes at 70° C.) in a non-stabilized beer, at 20° C., 4° C., with or without agitation.

Comparison of the YPE of the Invention with a Clouding Agent of the Prior Art, "Biocloud®"

This example studies the influence of the concentration of the clouding agent (YPE or Biocloud) on the turbidity of stabilized beer of "pils" type.

The YPE clouding agent (Spring'Finer) according to the invention is compared to the Biocloud® clouding agent of the prior art.

The beer used is of "pils" type. It is also referred to as pilsener, pilsen or pilsner. It is a clear, blonde beer of low fermentation, similar to a lager type. It has a content of approximately 5 degrees alcohol and has a medium bitterness, depending on the type of hops used.

Before addition thereof into bottles, each clouding agent (YPE or Biocloud) is dissolved in a volume of pils beer equivalent to one bottle. The mass of clouding agent used is such that the latter is concentrated 100 times. It is then necessary to add the clouding agent in solution to the bottles at an amount of 1/100 of the volume thereof.

The final concentrations tested range from 0 to 50 grams (g) of clouding agent per hectoliter (hl) of pils beer.

In order to illustrate the foregoing, a numbered example for the final concentration of 50 g/hl of clouding agent is now presented. 12.5 g of clouding agent are dissolved in 250 ml of pils beer, giving a concentration of 5000 g/hl. Next, 2.5 ml of this solution are added to 250 ml bottles of pils beer. Since the dilution factor is 100 (250/2.5), the final concentration is indeed 50 g/hl of clouding agent per 250 ml bottle of pils beer.

The samples are homogenized (agitated) before measurement. The measurements of turbidity at a 90° angle and at a 25° angle of the samples of beer are carried out at 4° C. with the Haffmans VOS ROTA 90/25 nephelometer. The turbidity values are expressed in EBC.

Results

The results are illustrated in FIG. 1 (FIG. 1a and FIG. 1b).

The turbidity values increase linearly with the concentration of the clouding agent.

The YPE causes finer haze in the beer than Biocloud. Indeed, it is noted that the turbidity for the YPE is higher at 90° than at 25°, while the opposite is observed for Biocloud.

Conclusion

It appears that the YPE gives finer haze than Biocloud, affording it the advantage of being more homogeneous and therefore more attractive for the consumer. Moreover, it has less tendency to sediment in the bottom of the bottle, thus providing a positive influence on the stability of the haze over time.

Example 2

Influence of the Type of Beer and the Temperature on the Turbidity Values Obtained with the YPE Products tested:

Clouding agent of the invention YPE (Spring'Finer)

Beer A: filtered, stabilized (all the "protein-polyphenol" complexes responsible for haze have been removed) and pasteurized beer.

Beer B: centrifuged and pasteurized beer (non-stabilized).

Beer C: centrifuged beer (non-pasteurized and non-stabilized).

Before addition to the bottles, the clouding agent YPE is dissolved in a volume of beer A, B or C equivalent to one bottle, and is pasteurized for 20 minutes at a temperature of 70° C. The mass of clouding agent used is such that the latter is concentrated 100 times. It is then necessary to add the clouding agent in solution to the bottles at an amount of 1/100 of the volume thereof.

The final concentration in each bottle is 30 grams (g) of YPE dissolved beforehand per hectoliter (hl) of beer.

The samples are homogenized (agitated) before measurement.

The measurements of turbidity of the beer samples are carried out at an angle of 90°, at a temperature of 20° C. and 4° C. with the Haffmans VOS ROTA 90/25 nephelometer. The turbidity values are expressed in EBC.

Results

The results are illustrated in table 1 below.

TABLE 1

Turbidity values (EBC) at 90° angle for samples of beers (A, B, C) comprising 30 g/hl of YPE (pasteurized beforehand in solution) and for two commercial Belgian white beers (white 1, white 2), at 20° C. and 4° C.

| Beer | Turbidity at 90° (EBC) 20° C. | Turbidity at 90° (EBC) 4° C. |
|---|---|---|
| A (test 1) | 13 | 30 |
| A (test 2) | 26 | 51 |
| B | 20 | 96 |
| C | 28 | 100 |
| White 1 | 23 | 100 |
| White 2 | 35 | 100 |

The turbidity values are higher for a temperature of 4° C. than for a temperature of 20° C.: the YPE is involved in the formation of chill haze due to the association of polypeptides and polyphenols.

As expected, the formation of chill haze in the presence of the YPE is improved in the non-stabilized beers (B and C). This is because, in the stabilized beer (A), all the "protein-polyphenol" complexes responsible for the haze were removed.

Conclusion

The YPE added to the non-stabilized beers (B and C) makes it possible to achieve a chill haze similar to that of commercial Belgian white beers (white 1 and white 2).

Example 3

Stability of the Haze Associated with the Use of the YPE in Non-Stabilized Beers Products tested:

Clouding agent YPE (Spring'Finer) of the invention

Beer C: centrifuged beer (non-pasteurized and non-stabilized).

Before addition to bottles, the clouding agent YPE is dissolved in a volume of beer C equivalent to one bottle. The mass of clouding agent used is such that the latter is concentrated 100 times. It is then necessary to add the clouding agent in solution to the bottles at an amount of 1/100 of the volume thereof.

Treatments:

No pasteurization: Native YPE

Solution of YPE concentrated 100 times (obtained by dissolving beforehand in beer C), pasteurized for 20 minutes at 70° C. before addition to bottles.

The concentrations finally tested in the bottles are 0, 20, 30 and 50 g of YPE dissolved beforehand/hl of beer.

The measurements of turbidity of the beer samples are carried out at 90°, at a temperature of 20° C. and 4° C. with the Haffmans VOS ROTA 90/25 nephelometer. The turbidity values are expressed in EBC.

The turbidities of the beers containing the YPE are measured over a period of time of 75 days. The beers are stored at 20° C. and 4° C. and the turbidity thereof is measured before homogenization (agitation) and after homogenization of the samples (in order to reproduce the conditions of serving the beer: "first pour half a glass and gently swirl the bottle before filling the glass").

Results

The results are illustrated in FIGS. 2 to 6.

1) Native YPE in Solution (no Pasteurization of the Clouding Agent YPE)

The turbidity values obtained as a function of time for the beer C to which the native YPE was added at different concentrations are illustrated:

FIG. 2a (no agitation before measurement) and FIG. 2b (agitation before measurement), for a temperature of 20° C., FIG. 3a (no agitation before measurement) and FIG. 3b (agitation before measurement), for a temperature of 4° C.

2) YPE in Solution, Pasteurized for 20 Minutes at a Temperature of 70° C. before Addition to Bottles The turbidity values obtained as a function of time for the beer C to which the pasteurized YPE in solution was added at different concentrations are illustrated:

FIG. 4a (no agitation before measurement) and FIG. 4b (agitation before measurement), for a temperature of 20° C., FIG. 5a (no agitation before measurement) and FIG. 5b (agitation before measurement), for a temperature of 4° C.

3) Summary of Points 1 and 2 for the Concentration of 30 g/hl

The turbidity values for the beer C, to which native YPE and pasteurized YPE in solution had been added at an amount of 30 g/hl, measured at 20 and 4° C., with or without agitation, are illustrated in FIG. 6.

Observations and Conclusion from FIGS. 2 to 6

The main aim of the use of a clouding agent is that the haze remains stable over time and therefore does not sediment at the bottom of the bottles.

Although the haze of the beers due to the use of the (native or pasteurized) YPE decreases slightly at first, it eventually stabilizes.

Again, the turbidity values are higher for a temperature of 4° C. than for a temperature of 20° C.: the YPE is involved in the formation of chill haze due to the association of polypeptides and polyphenols.

The use of the native YPE is therefore a good choice, since on the one hand it is simple to use and on the other hand it enables good stability of the haze of the beer over time.

Example 4

Stability of the Haze Associated with the use of the YPE in a Pils Beer

Products tested:

Clouding agent of the invention YPE (Spring'Finer)

Beer A: filtered, stabilized (all the "protein-polyphenol" complexes responsible for haze have been removed) and pasteurized beer.

Before addition to bottles, the clouding agent YPE is dissolved in a volume of beer A equivalent to one bottle. The mass of clouding agent used is such that the latter is concentrated 100 times. It is then necessary to add the clouding agent in solution to the bottles at an amount of 1/100 of the volume thereof.

Treatments:

No pasteurization: Native YPE

Solution of YPE concentrated 100 times (obtained by dissolving beforehand in beer A), pasteurized for 20 minutes at 70° C. before addition to bottles.

Pasteurization of the bottles for 20 minutes at 70° C. after addition of the 100 times concentrated, non-pasteurized YPE solution.

The concentrations finally tested in the bottles are 0, 20, 30 and 50 g of YPE dissolved beforehand/hl of beer.

The measurements of turbidity of the beer samples are carried out at 90°, at a temperature of 20° C. and 4° C. with the Haffmans VOS ROTA 90/25 nephelometer. The turbidity values are expressed in EBC.

The turbidities of the beers containing the YPE are measured over a period of time of 75 days. The beers are stored at 20° C. and 4° C. and the turbidity thereof is measured before homogenization (agitation) and after homogenization of the samples.

Results

Figure 7:
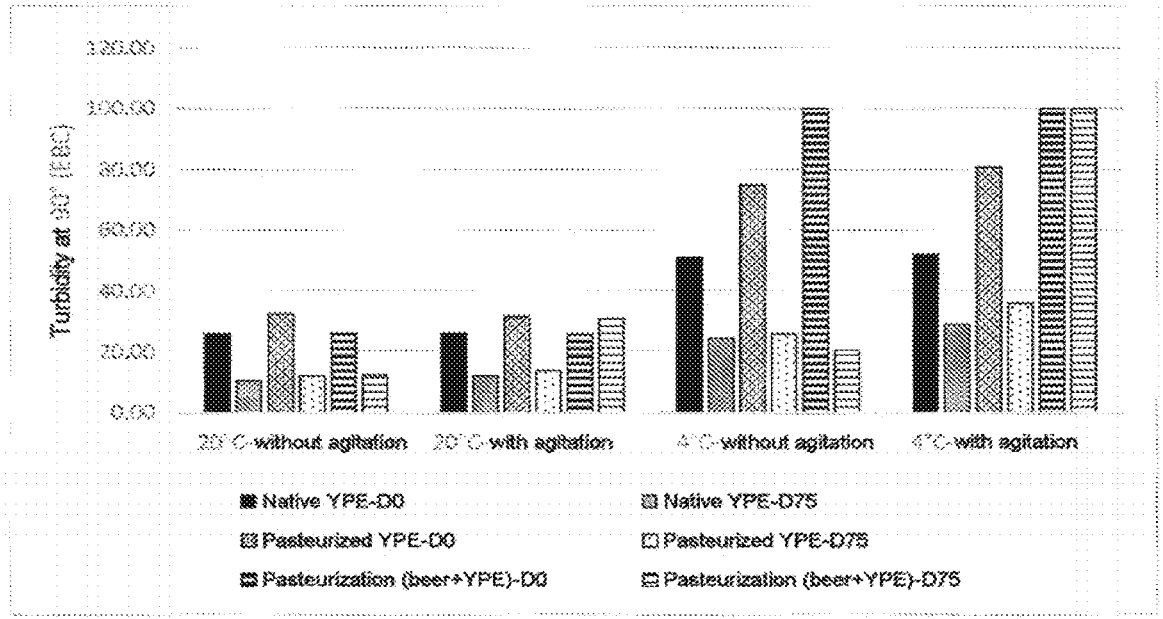
FIG. 7 is a histogram illustrating the turbidities obtained for a YPE at a concentration of 30 g/hl (native YPE, YPE pasteurized for 20 minutes at 70° C. before addition to bottles, and YPE pasteurized for 20 minutes at 70° C. in bottles with the beer) in a stabilized beer of "pils" type, at 20° C., 4° C., with or without agitation.

The turbidity values measured at an angle of 90° for the beer A, to which native YPE (30 g/hl), dissolved YPE pasteurized beforehand (30 g/hl), and YPE dissolved and pasteurized in the bottles with the beer (30 g/hl) was added, at 20 and 4° C., with or without agitation, are illustrated in FIG. 7.

Observations and Conclusions

It can be seen from FIG. 7 that the haze in the beer comprising the native YPE or the pasteurized YPE decreases significantly during the storage of the beer.

The stability of the haze over time in the presence of the YPE (native or pasteurized) at 4° C. is negatively impacted in stabilized beers, whereas this is not the case for non-stabilized beers (see FIG. 6).

This is because, in stabilized beers of pils type (beer A), all the "protein-polyphenol" complexes responsible for the haze have been removed.

Moreover, the pasteurization of the beer comprising the YPE dissolved beforehand appears to have an impact on the clouding agent in terms of its structure and therefore affects the stability of the haze. This is because, when the sample is not homogenized before measurement, a significant decrease in the haze is observed; however, said haze is completely resuspended when the bottle is agitated, which suggests that the YPE has been degraded.

Bibliography

1. Steiner E., Becker T. and Gastl M., Turbidity and Haze Formation in Beer—Insights and Overview, 2012, J. Inst. Brew., 116, 360-368.
2. Delvaux, F., Delvaux, F. R., Delcour, Characterisation of the colloidal haze in commercial and pilot scale Belgian white beers, 2000, J. Inst. Brew., 106, 221-227.
3. Bamforth, C. W., Beer haze. 1999, J. Am. Soc. Brew. Chem., 57(3), 81-90.
4. Loisa, M., Nummi, M. and Daussant, J., Quantitative determination of some beer protein components by an immunological method, 1971, Brauwissenschaft, 24(10), 366-368.
5. Asano, K., Shinagawa, K. and Hashimoto, N., Characterization of haze-forming proteins of beer and their roles in chill haze formation, 1982, J. Am. Soc. Brew. Chem., 40(4), 147-154.
6. Limure, T., Nankaku, N. Watanabe-Sugimoto, M., Hirota, N., T. Z., Kihara, M., Hayashi, K., Ito, K. and Sato, K., Identification of novel haze-active beer proteins by proteome analysis, 2009, J. Cereal Sci., 49(1), 141-147.
7. Leiper, K. A., Stewart, G. G. and McKeown, I. P., Beer polypeptides and silica gel. Part I. Polypeptides involved in haze formation, 2003, J. Inst. Brew., 109(1), 57-72.
8. Nadzeyka, A., Altenhofen, U. and Zahn, H., The significance of beer proteins in relationship to cold break and age-related haze Formation, 1979, Brauwissenschaft, 32(6), 167-172.
9. Siebert, K. J., Carrasco, A. and Lynn, P. Y., Formation of protein-polyphenol haze in beverages, 1996, J. Agr. Food Chem., 44(8), 1997-2005.
10. Revue des cenologues, N° 120; pages 47-50, 2006.

The invention claimed is:

1. A method comprising introducing into a beer a yeast protein extract,
   wherein said beer comprises suspended particles,
   wherein the yeast protein extract is prepared by plasmolysis of an intact yeast, separation by centrifugation and recovery of a soluble fraction comprising the yeast protein extract, and
   wherein said introducing results in preventing the precipitation of said suspended particles, thus stabilize haze or turbidity of said beer.

2. A method as claimed in claim 1, wherein the yeast protein extract comprises from 30 to 40% by weight of proteins having a molecular weight of greater than 15 kDa.

3. A method as claimed in claim 1, wherein the yeast protein extract comprises from 10 to 14% by weight of ribonucleotides having a mean number of bases of 280.

4. A method as claimed in claim 1, wherein the yeast protein extract is in the form of a powder or liquid.

5. A method as claimed in claim 1, wherein the yeast is selected from the group consisting of *Saccharomyces, Kluyveromyces, Torula* and *Candida*.

6. A method as claimed in claim 1, wherein the yeast protein extract is in the form of powder and is introduced into the beer in a content ranging from 5 g (grams) to 80 g per hectoliter (hl) of beer.

7. A method as claimed in claim 1, wherein the yeast protein extract stabilizes the haze of the beer, at a turbidity ranging from 40 to 120 EBC, for up to 80 days, the turbidity values being measured using a 90/25 nephelometer at a temperature of 4° C. and for a 90° angle (Analytica EBC — method 9.30).

8. A method as claimed in claim 1, wherein the yeast protein extract comprises from 30 to 40% by weight of proteins having a molecular weight of greater than 30 kDa.

9. A method as claimed in claim 1, wherein the yeast is *Saccharomyces cerevisiae*.

10. A method as claimed in claim 1, wherein the yeast protein extract is in the form of powder and is introduced into the beer in a content ranging from 30 g (grams) to 50 g per hectoliter (hl) of beer.

11. A method as claimed in claim 7, wherein the yeast protein extract stabilizes the haze of the beer at a turbidity ranging from 60 to 100 EBC up to 80 days.

* * * * *